United States Patent
Hsieh et al.

(10) Patent No.: US 8,223,819 B2
(45) Date of Patent: Jul. 17, 2012

(54) SPECTRALLY SHAPED PSEUDO-RANDOM NOISE SEQUENCE GENERATOR AND METHOD THEREOF

(75) Inventors: Hong-Yean Hsieh, Sunnyvale, CA (US); Chia-Liang Lin, Union City, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 1236 days.

(21) Appl. No.: 11/548,250

(22) Filed: Oct. 10, 2006

(65) Prior Publication Data

US 2008/0084921 A1   Apr. 10, 2008

Related U.S. Application Data

(60) Provisional application No. 60/730,777, filed on Oct. 27, 2005.

(51) Int. Cl.
*H04B 1/00* (2006.01)
(52) U.S. Cl. ........ 375/146; 375/130; 375/140; 370/319; 370/320; 370/321; 370/330; 370/335; 370/342; 370/345; 370/347
(58) Field of Classification Search .................. 375/146, 375/130, 140; 370/319, 320, 321, 330, 335, 370/342, 345, 347
See application file for complete search history.

(56) References Cited

U.S. PATENT DOCUMENTS

| | | | |
|---|---|---|---|
| 4,125,898 A | 11/1978 | DeHart et al. | |
| 4,855,944 A | 8/1989 | Hart | |
| 5,257,282 A * | 10/1993 | Adkisson et al. | 708/253 |
| 5,519,736 A * | 5/1996 | Ishida | 375/367 |
| 5,822,360 A * | 10/1998 | Lee et al. | 375/140 |
| 6,411,976 B1 * | 6/2002 | Cesari et al. | 708/319 |
| 6,768,437 B1 * | 7/2004 | Ruotsalainen et al. | 341/143 |
| 2003/0152137 A1 * | 8/2003 | Shi et al. | 375/146 |
| 2003/0214926 A1 * | 11/2003 | Choi et al. | 370/335 |

FOREIGN PATENT DOCUMENTS

| | | |
|---|---|---|
| WO | WO-02085867 | 10/2002 |
| WO | WO-03044777 | 5/2003 |

* cited by examiner

*Primary Examiner* — David C. Payne
*Assistant Examiner* — Zewdu Kassa
(74) *Attorney, Agent, or Firm* — Winston Hsu; Scott Margo

(57) ABSTRACT

Systems and methods for generating spectrally shaped pseudo random noise sequences are described, which may include generating an L-level PN sequence, where L is an integer greater than 1; up-sampling the PN sequence by a factor of M, where M is an integer greater than 1; and filtering the up-sampled PN sequence using a finite impulse response (FIR) filter of length M, where the coefficients of the FIR filter are chosen from a set of pre-determined values.

20 Claims, 8 Drawing Sheets white PN sequence  1    -1    1    1    -1    -1    1 up-sample-by 4  1 0 0 0 -1 0 0 0 1 0 0 0 1 0 0 0 -1 0 0 0 -1 0 0 0 1 0 0 0 output sequence  | 1 -1 -1 1 | -1 1 1 -1 | 1 -1 -1 1 | 1 -1 -1 1 | -1 1 1 -1 | -1 1 1 -1 | 1 -1 -1 1 |

# SPECTRALLY SHAPED PSEUDO-RANDOM NOISE SEQUENCE GENERATOR AND METHOD THEREOF

CROSS-REFERENCE TO RELATED APPLICATION

The present application claims priority under U.S.C. 119 to U.S. provisional application Ser. No. 60/730,777, filed Oct. 27, 2005, which applications and publication are incorporated herein by reference and made a part hereof.

BACKGROUND OF THE INVENTION

1. Field of the Invention

The present invention relates generally to pseudo-random noise sequence generators, and in particular to pseudo-random noise sequence generators that generate a spectrally shaped noise sequence.

2. Background

Pseudo-random noise (PN) sequences are used in many applications. Among them is a delta-sigma modulator. A delta-sigma modulator utilizes a combination of over-sampling and spectral shaping of quantization noise to achieve a high-resolution data conversion despite using a coarse quantization. The principle of delta-sigma modulation is well known and thus not described in detail here. It is also well known that a delta-sigma modulator is prone to a problem known as "limit cycle oscillations," which is observed when the output exhibits an unwanted periodic pattern within a time span. "Limit cycle oscillations" are highly undesirable. In audio applications limit cycle oscillations may be audible. Limit cycle oscillations has been an active area of research to alleviate this problem. The most common approach to avoid "limit cycle oscillations" is to use "dithering", which injects a PN sequence into the modulator and thus breaks up an otherwise periodic output pattern. This effectively suppresses "limit cycle oscillations" but unfortunately also increases the noise floor of the modulator. The noise floor is the sum of all noise sources and unwanted signals. Other sources of noise include thermal noise sources within a system. Increasing the noise floor reduces the minimum signal level that can be detected in a system. There is unavoidably a trade-off between "spurious tones" (due to limit cycle oscillations) and noise floor in prior art delta-sigma modulators.

Prior art delta-sigma modulators use a PN sequence generator constructed by a linear feedback shift register (LFSR). A LFSR consisting of N-bit shift registers is able to generate a repetitive sequence of $2^N-1$ binary numbers. The power spectral density (PSD) of a PN sequence is white, i.e., all spectral components are of equal power. Delta-sigma modulators, on the other hand, rely on spectral shaping to suppress the noises in the signal band of interest thus achieving a high-resolution data. The injection of a white PN sequence into the delta-sigma modulator adds a white noise sequence to the modulator and thus does not fully comply with the underlying principle of a delta-sigma modulator. In some prior arts, a PN sequence is injected immediately before the internal quantizer of the modulator, and the injected PN noise is thus also spectrally shaped along with the quantization error. This may help to suppress the in-band components of the injected PN sequence. However, the in-band noise floor still increases, compared to the case wherein no PN sequence is injected.

What is needed is a spectrally shaped PN sequence generator that has very low in-band spectral components and the effect of dithering on the in-band noise floor is thus negligible.

SUMMARY

In an embodiment, methods and systems for generating a spectrally shaped pseudo-random noise (PN) sequence is disclosed. The method may include generating an L-level PN sequence, where L is an integer greater than 1, up-sampling the PN sequence by a factor of M, where M is an integer greater than 1, and filtering the up-sampled PN sequence using a finite impulse response (FIR) filter of length M, where the coefficients of the FIR filter are chosen from a set of pre-determined values.

In an embodiment, methods and systems for generating a spectrally shaped pseudo-random noise (PN) sequence are disclosed. The method or system may include determining a plurality of patterns from L patterns of data streams, each pattern including a data stream of length M, where M is an integer greater than 1; generating an L-level PN sequence; and passing one pattern of data stream among the L patterns of data streams to the output according to the value of the L-level PN sequence.

In an embodiment, methods and systems for performing delta-sigma modulation with dithering are disclosed. The method or system may include receiving an input in a modulator; receiving a dithering signal from a spectrally shaped PN sequence generator; performing delta-sigma data modulation on the modulator input; injecting the dithering signal into a circuit node of the modulator; and generating a modulator output.

These and other embodiments, aspects, advantages, and features of the present invention, as well as various methods for producing, forming, and assembling the devices, circuitry, apparatus, software, hardware, and systems described, will be set forth in the detailed description which follows. Other aspects and features will also become apparent to those skilled in the art after due study of the drawings included herein, and a review of the detailed description, as well as by the practice of the invention. Such aspects, advantages, and features of the invention are realized and attained by exercising the instrumentalities, procedures, and combinations particularly pointed out in the appended claims.

BRIEF DESCRIPTION OF THE DRAWINGS

The drawings illustrate generally, by way of example, but not by way of limitation, various embodiments discussed in the present document.

DETAILED DESCRIPTION

In the present disclosure, numerous specific details are provided, such as examples of apparatus, circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

In the present disclosure, methods of generating a spectrally shaped pseudo-random noise (PN) sequence and systems therefore are disclosed. Pseudo-random noise (PN) sequence may be thought of as a deterministic sequence of pulses that repeats itself after its period and meets certain criteria for randomness. Spectral shaping includes processing a signal to change its power distribution, creating frequency nulls, or otherwise alters the signal for various purposes. One application of spectral shaping includes altering, shaping or filtering the encoded analog signal to improve its ability to be transmitted between electronic devices.

Figure 1:
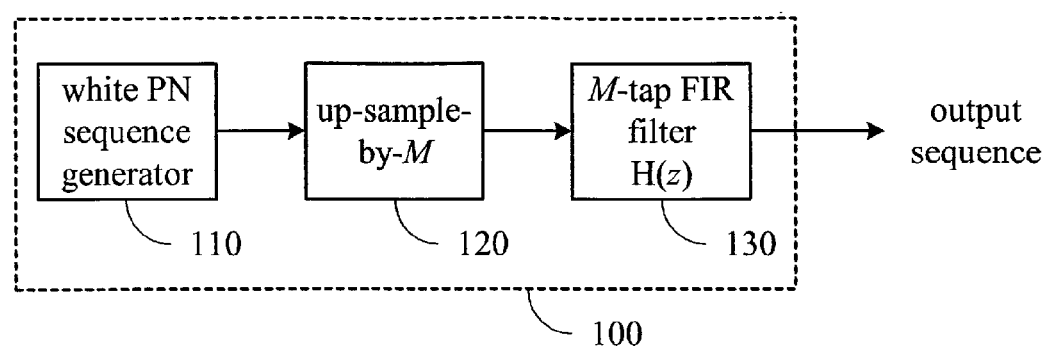
FIG. 1 is a block diagram of a spectrally shaped, pseudo-random noise sequence generator in accordance with an embodiment of the present invention.

An example embodiment of a spectrally shaped PN sequence generator 100 in accordance with an embodiment of the present invention is shown in FIG. 1. The generator 100 includes a white PN sequence generator 110, an up-sample-by-M function 120, and a M-tap finite impulse response (FIR) filter 130 of response H(z). Here, M is an integer greater than 1. The white PN sequence generator 110 generates a white binary (±1) sequence. The white PN sequence generator may be made of cascaded flip-flop circuits with feedback connections. One feedback connection is from the output. Other feedback connections are provided. The feedback connections are combined and become the input to the first flip-flop circuit. In an embodiment, a linear feedback shift register is used. Other methods known in prior art may also be used. The up-sample-by-M function 120 may be implemented in hardware. The up-sample-by-M function 120 causes an M-fold increase in the rate of the white PN sequence by inserting (M−1) zeros between every two binary outputs of the white PN sequence generator 110. For example, if M=2 (corresponding to $1^{st}$ order spectral shaping) and the output of the white PN sequence generator 110 is 1, −1, 1, 1, −1, −1, and so on, then the output of the up-sample-by-M function 120 will be 1, 0, −1, 0, 1, 0, 1, 0, −1, 0, −1, 0, and so on. The output of the up-sample-by-M function 120 will be filtered by the subsequent M-tap FIR filter 130. Every coefficient of the FIR filter 130 need to be either 1 or −1, so that the filter output will also always be either 1 or −1.

The frequency response of the M-tap FIR filter 130 determines the spectral shape of the output of the generator 100. For applications to low-pass delta-sigma modulators, it is desirable for the PN sequence to have a high-pass spectral shape. This can be achieved by properly choosing a function H(z) that exhibit a high-pass response. For example, if the FIR filter 130 has the response of $H(z)=1-z^{-1}$, i.e., the FIR coefficients are 1 and −1, the output of the generator 100 will have a $1^{st}$ order high-pass shaping. If the FIR filter 130 has the response of $H(z)=1-z^{-1}-z^{-2}+z^{-3}$, i.e., the FIR coefficients are 1, −1, −1, and 1, the output sequence of the generator 100 will have a $2^{nd}$ order high-pass shaping. Table 1 lists exemplary FIR filter responses for achieving $1^{st}$, $2^{nd}$, $3^{rd}$, and $4^{th}$ order high-pass noise shaping.

Figure 2:
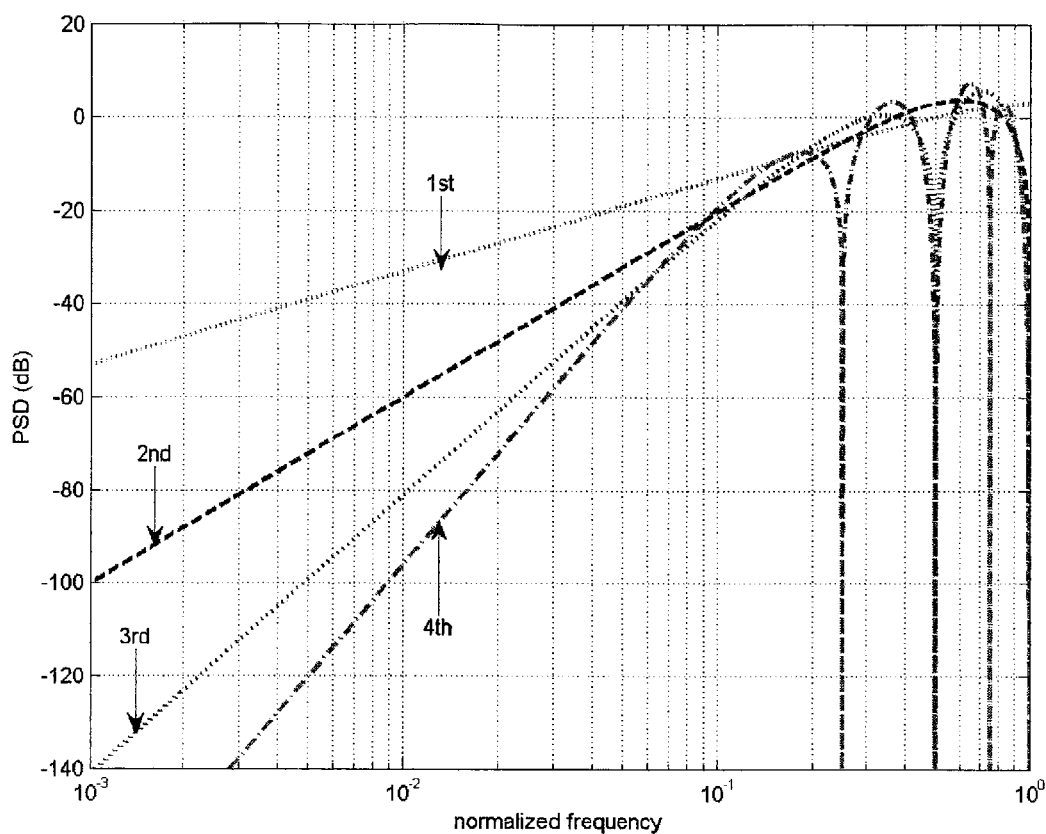
FIG. 2 is a graph of power spectral densities (PSD) of spectrally shaped, pseudo-random noise sequence generator in accordance with an embodiment of the present invention.

FIG. 2 shows the power spectral densities (PSD) of their respective output sequences. Note that $1^{st}$ order noise shaping is characterized by a slope of 20 dB per decade in PSD, $2^{nd}$ order noise shaping is characterized by a slope of 40 dB per decade in PSD, $3^{rd}$ order noise shaping is characterized by a slope of about 80 dB per decade slope in PSD, $4^{th}$ order noise shaping is characterized by about 100 dB per decade slope in PSD, and so on. The frequency scale is normalized such that unity corresponds to half the sample rate. Accordingly, this embodiment shows that the output sequence has low in-band spectral components and will not raise in-band floor noise in subsequent use of the output sequence.

TABLE 1

| Order of noise shaping | FIR filter response H(z) |
| --- | --- |
| 1 | $1 - z^{-1}$ |
| 2 | $1 - z^{-1} - z^{-2} + z^{-3}$ |
| 3 | $1 - z^{-1} - z^{-2} + z^{-3} - z^{-4} + z^{-5} + z^{-6} - z^{-7}$ |
| 4 | $1 - z^{-1} - z^{-2} + z^{-3} - z^{-4} + z^{-5} + z^{-6} - z^{-7} - z^{-8} + z^{-9} + z^{-10} - z^{-11} + z^{-12} - z^{-13} - z^{-14} + z^{-15}$ |

Figures 3, 4:
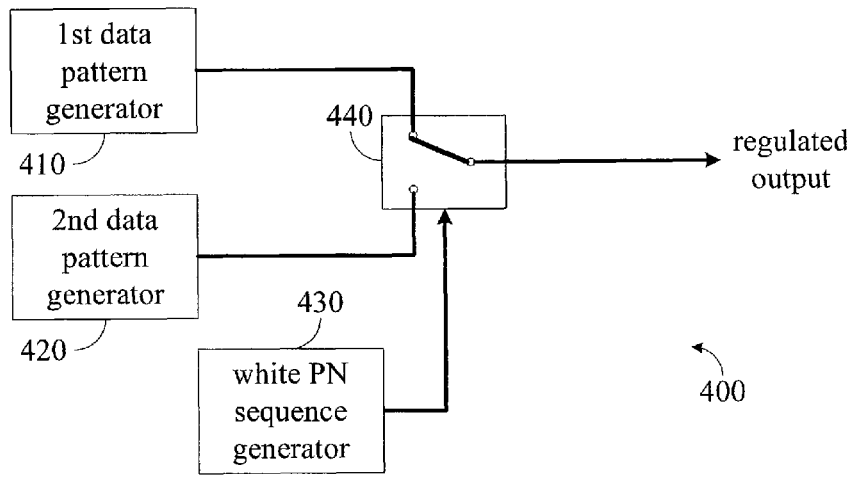
FIG. 3 illustrates an example sequence generated in accordance with an embodiment of the present invention.
FIG. 4 is a block diagram of a spectrally shaped, pseudo-random noise sequence generator in accordance with an embodiment of the present invention.

FIG. 3 shows an example sequence generated by the generator 100 for M=4 and $H(z)=1-z^{-1}-z^{-2}+z^{-3}$. First, a white PN binary sequence is generated. Next, three zeros are inserted between every two binary numbers of the white PN sequence to generate the up-sample-by-4 sequence, which is then filtered by $H(z)=1-z^{-1}-z^{-2}+z^{-3}$. The output sequence consists of bit streams of two patterns: 1, −1, −1, 1, and −1, 1, 1, −1. When the white PN binary number is 1, the corresponding data stream in the output sequence will be 1, −1, −1, 1, which is the impulse response of the filter H(z); when the white PN binary number is −1, the corresponding data stream in the output sequence will be −1, 1, 1, −1, which is the inversion of the impulse response of the filter H(z). Therefore, the output consists of a data stream of either pattern 1, −1, −1, 1, or pattern −1, 1, 1, −1. This observation leads to an embodiment of the present invention.

FIG. 4 depicts a block diagram for generating spectrally shaped PN sequence in an embodiment of the present invention. The spectrally shaped PN sequence generator 400 includes a $1^{st}$ data pattern generator 410, a $2^{nd}$ data pattern generator 420, a white PN sequence generator 430, and a switch 440. The $1^{st}$ data pattern generator 410 generates a data stream of a first fixed pattern of length M, where M is an integer greater than 1. For example, the first fixed pattern is: 1, −1, −1, 1 (M=4). Likewise, the $2^{nd}$ data pattern generator 420 generates a data stream of a $2^{nd}$ fixed pattern of length M. For example, the second fixed pattern is: −1, 1, 1, −1 (M=4). Switch 440, which is controlled by the output from the white PN sequence generator 430, determines which data pattern is to be passed to the output. For example, when the output from the white PN sequence generator is 1, the data stream of the $1^{st}$ data pattern is passed to the output; otherwise, the data stream of the $2^{nd}$ data pattern is passed to the output. For both the $1^{st}$ data pattern generator 410 and the $2^{nd}$ data pattern generator 420, the output data rate is M-fold higher than that of the white PN sequence generator.

Aforementioned methods and systems are all related to generating a spectrally shaped PN sequence of binary numbers, each having two possible levels (1 and −1). Embodiments of the present invention, either using the embodiment shown in FIG. 1 or the embodiment shown in FIG. 4, can be easily extended to generate a spectrally shaped PN sequence of numbers of more than two possible levels. For example, it can be used to generate a spectrally shaped PN sequence of ternary numbers. A ternary number has three possible levels, say 1, 0, and −1. The spectrally shaped PN sequence generator 100 shown in FIG. 1 will generate a spectrally shaped PN sequence of ternary numbers if the coefficients of the M-tap FIR filter are ternary. For example, if M=4 and $H(z)=1-z^{-1}+0\cdot z^{-2}+0\cdot z^{-3}$, the spectrally shaped PN sequence generator 100 will generate a $1^{st}$ order spectrally shaped PN sequence of ternary numbers. This is equivalent to using 1 −1, 0, 0 as the $1^{st}$ fixed data pattern, and −1, 1, 0, 0 as the $2^{nd}$ fixed data pattern for the embodiment shown in FIG. 4.

An alternative method and system to extend the use of the present invention to generate a spectrally shaped PN sequence of more than two levels is described as follows. The spectrally shaped PN sequence generator 100 shown in FIG. 1 will generate a spectrally shaped PN sequence of ternary numbers if the output of the white PN sequence generator 110 is ternary, instead of binary, and the coefficients of the M-tap FIR filter are also ternary. When generating a white PN sequence of ternary numbers one may use, for example, two white binary PN sequence generators that generate two statistically independent white PN sequences of binary numbers. The output from one of the binary PN sequence generator determines whether the ternary output is 0 or not. If the ternary output is not 0, the output from the other binary PN sequence generator then determines whether the ternary output is 1 or −1. Other methods for generating a white PN sequence of ternary numbers are known to those of skill in the art.

Figure 5:
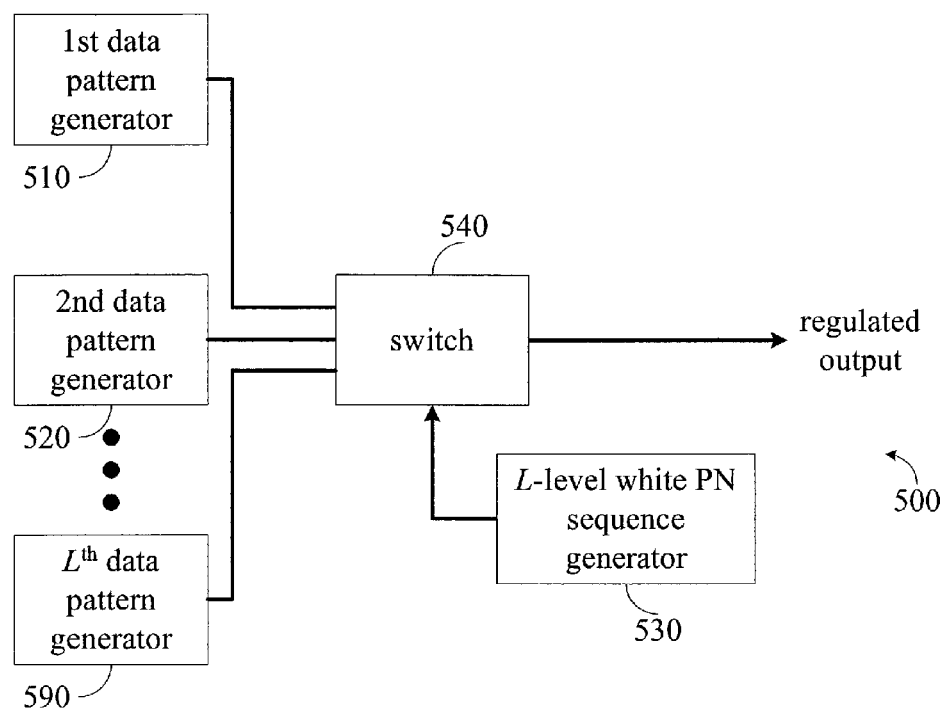
FIG. 5 is a block diagram of a spectrally shaped, pseudo-random noise sequence generator in accordance with an embodiment of the present invention.

An alternative embodiment for generating a spectral shaped PN sequence of more than two levels is shown in FIG. 5. Here, the generator 500 includes a plurality of fixed data pattern generators, e.g., $1^{st}$ data pattern generator 510, $2^{nd}$ data pattern generator 520, $L^{th}$ data pattern generator 590. Generator 500 includes an L-level white PN sequence generator 530 and a switch 540. Each of the L data pattern generators generates a fixed pattern of data stream of length M. The L-level white PN sequence generator 530 may be implemented using, for example, by a plurality of statistically independent white binary PN sequence generators. Other methods for implementing the L-level white PN sequence generator 530 are known to those of skill in the art. The output of the L-level white PN sequence generator 530 is used to control the switch 540, which determines which the data pattern to be passed to the output. Also, the output data rate of each of the fixed data pattern generators (510, 520, 590) is M-fold higher than that of the L-level white PN sequence generator 530.

For those skilled in the art, the principle taught by this present invention can be applied to other spectral shaping or other number of levels of PN sequence.

Figure 6:
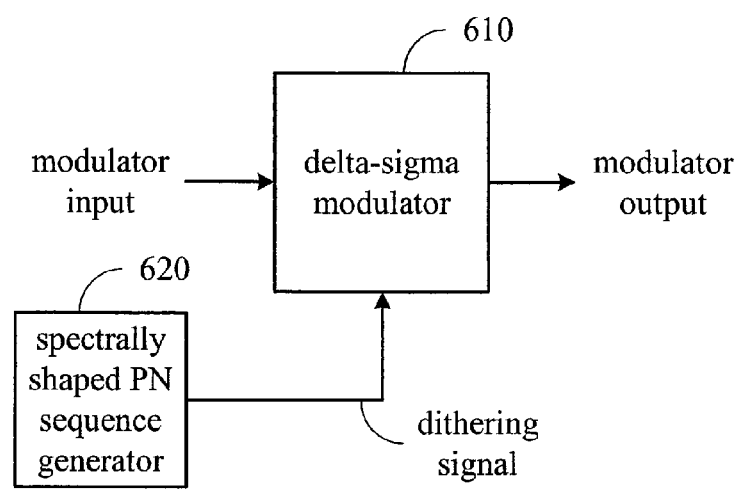
FIG. 6 is a block diagram of a system with a spectrally shaped, pseudo-random noise sequence generator in accordance with an embodiment of the present invention.

Embodiments of the present invention are particularly useful for implementing a "dithering" signal for a delta-sigma modulator. Dithering is a form of noise that is added to sample data in order to eliminate limit cycle oscillations. Dithering is used in digital audio and digital video signal processing. When an analog signal is converted to a digital signal, errors occur. These errors are due to the fact that an analog signal can be thought of as infinitely accurate and when digitized rounding errors occur. These rounding errors are quantization errors. FIG. 6 shows an exemplary application. A delta-sigma modulator 610 receives a modulator input and also a dithering signal from a spectrally shaped PN sequence generator 620, and generates a modulator output according to both the modulator input and the dithering signal. The spectrally shaped PN sequence generator 620 is implemented in accordance with embodiments of the present invention to produce the dithering signal. There are many methods for receiving and incorporating the dithering signal into a delta-sigma modulator. For example, the dithering signal can be injected at the modulator input or at an internal node within the modulator 610. One of skill in the art understands other methods and systems for providing a dithering signal and hence, are not explained in detail here.

Figure 7:
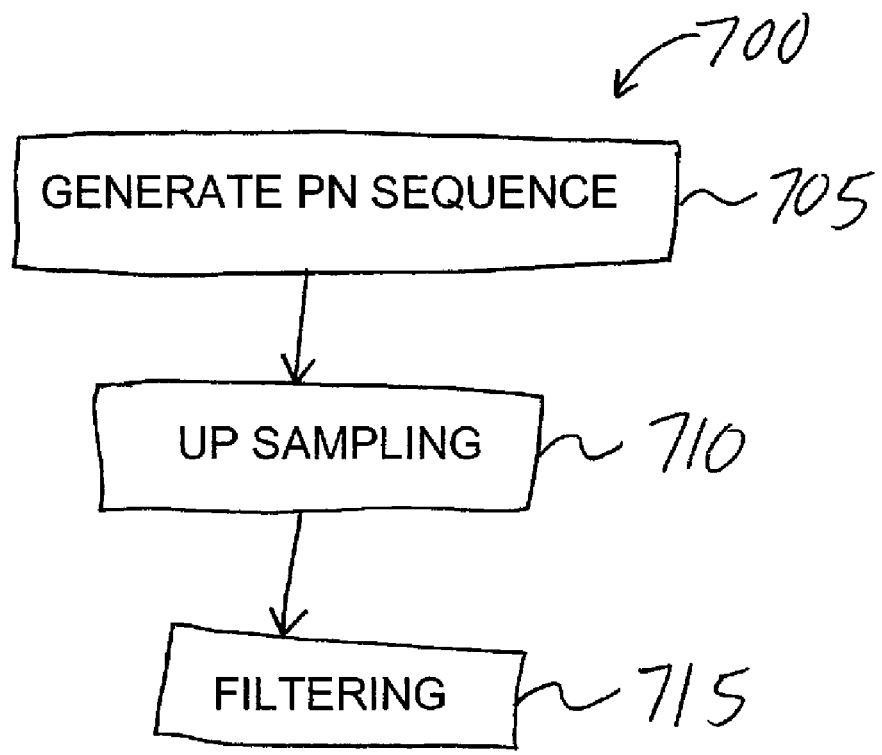
FIG. 7 is a flow chart according to an embodiment of the present invention.

FIG. 7 shows a method 700 according to an embodiment of the present invention. A PN sequence is generated, 705. The PN sequence is adapted to suppress limit cycle oscillations. However, the PN sequence as it currently stands may increase the noise floor. The generated PH sequence is up sampled, 710. The up-sampling operation may be an up sample by M function. This will insert M−1 zeros between the two consecutive values of the generated PN sequence. The up-sampled signal is then filtered, 715. The filtering may be a finite impulse response filter, with M coefficients. Accordingly, the filter outputs one of the M values of the coefficients.

Figure 8:
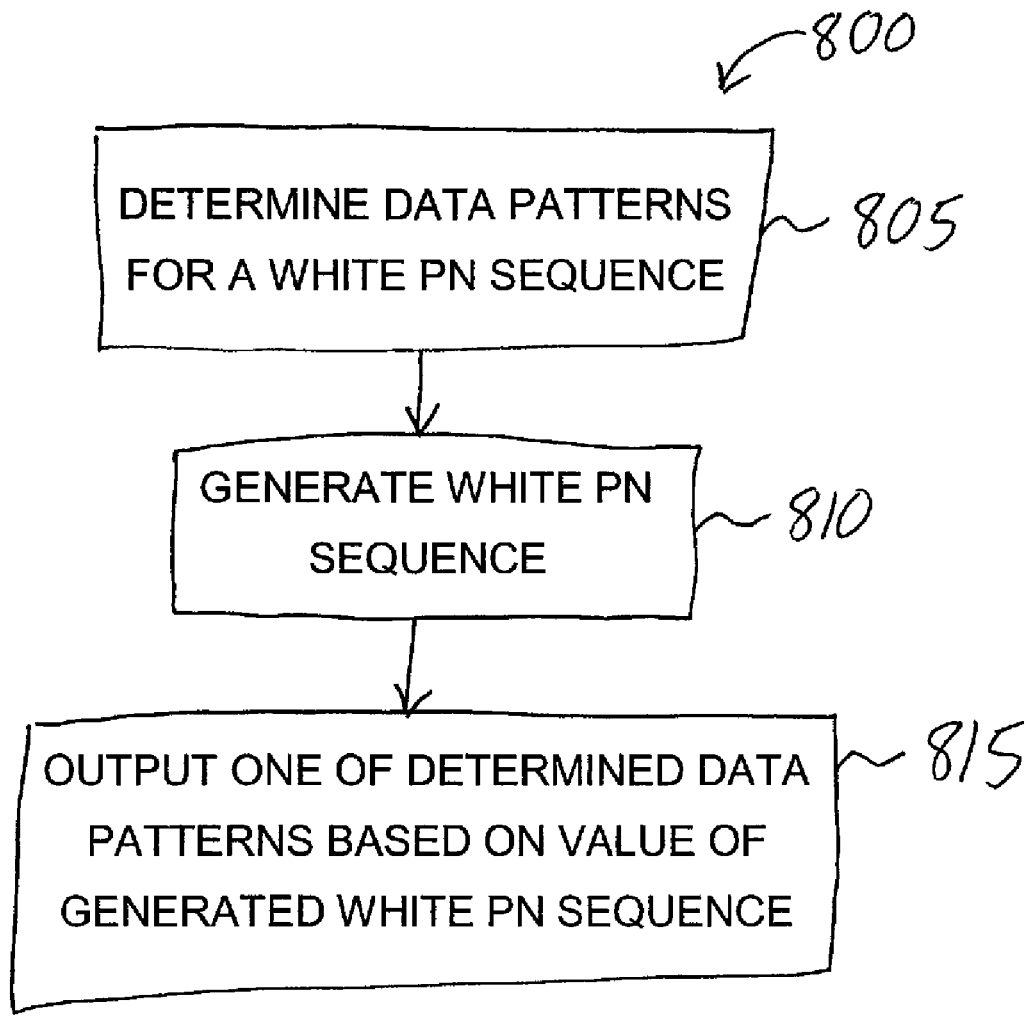
FIG. 8 is a flow chart according to an embodiment of the present invention.

FIG. 8 shows a method 800 according to an embodiment of the present invention. The data patterns used with a white PN sequence are generated, 805. The determination selects one from all possible data patterns that achieves the desired spectral shaping, 810. These selected patterns are stored for later output. The output is determined based on the actual value of a generated white PN sequence, 815. For example, the generated white PN sequence is not actually output, but triggers the output of one of the selected data patterns. This provides for spectral shaping and other benefits as discussed herein.

Figure 9:
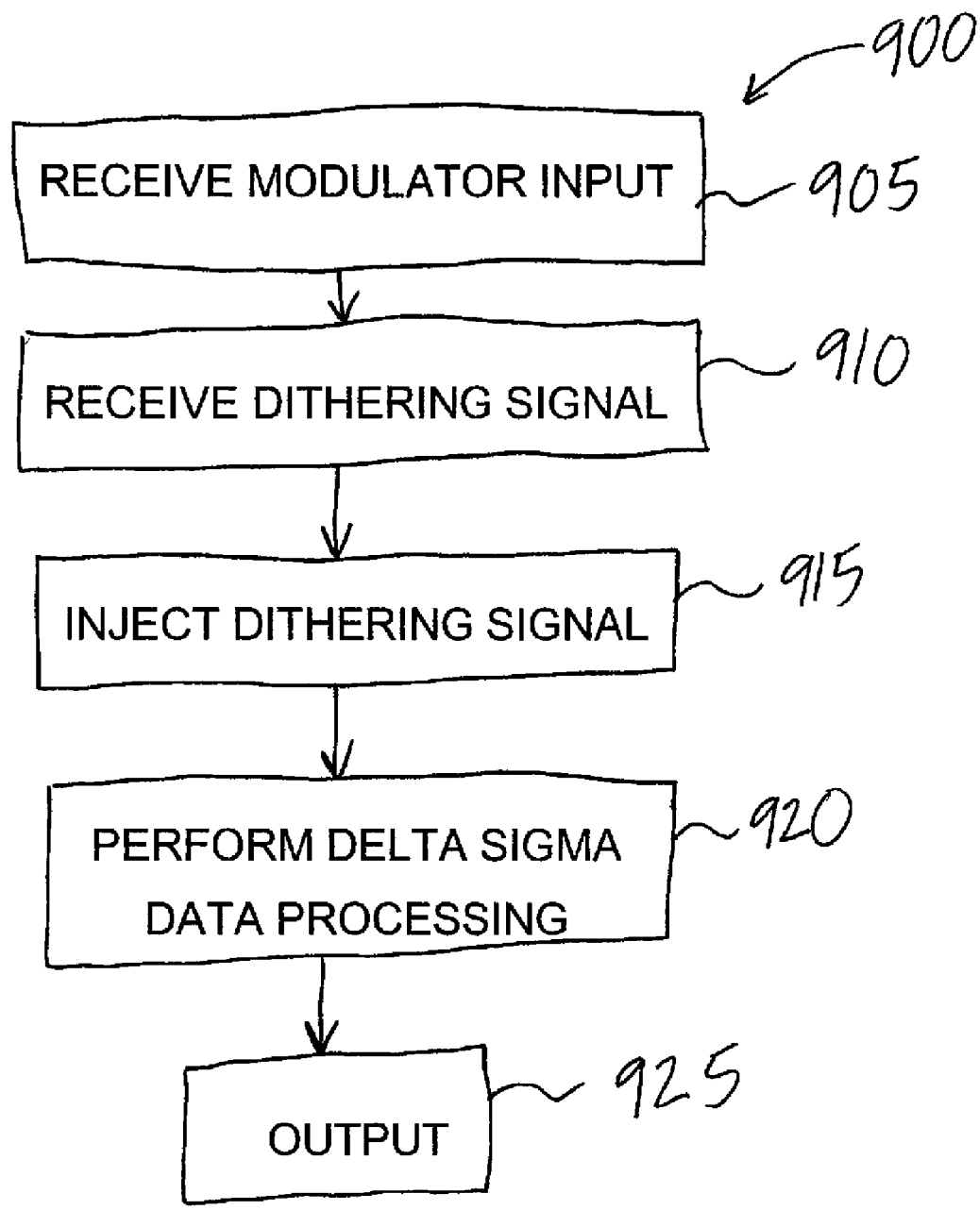
FIG. 9 is a flow chart according to an embodiment of the present invention.

FIG. 9 shows a method 900 according to an embodiment of the present invention. Method 900 is particularly suited for delta sigma signal processing. Modulator input is received, 905. A dithering signal is also received, 910. The dithering signal is produced using the methods and systems described herein, which provides a spectrally shaped PN data sequence. The dithering signal is input into a delta sigma modulator, 915. Delta sigma processing is performed, 920, and output, 925.

The methods and systems described herein provide improved methods and systems to reduce limit cycle oscillations while not significantly increasing the noise floor. One way of accomplishing this is to use a PN sequence to trigger the generation of a data pattern that represents the spectrally shaped PN sequence. For example, only the data patterns that are used for reduction of limit cycle oscillations and do match desired frequency profiles are output. The output does not reflect a white PN sequence but is spectrally shaped to provide the desired benefits and reduce the drawbacks. This output may then be used in devices that utilize delta-sigma modulation. Examples of such devices are electronic communication devices, modems, receivers, wireless transceivers such as mobile phones, and the like.

One particular application of methods and systems described herein is analog to digital converters (ADCs). ADCs convert analog signals to digital signals, in an accurate manner, with appropriate bandwidth and resolution requirements for that particular application. Digital circuitry has become increasingly prevalent in electronic devices such as telecommunications, audio, video, portable/mobile communication transmitters and receivers. If a signal is converted from analog to digital early in signal processing flow, then analog components can be eliminated, which should result in reductions in size, weight, and power consumption by the device. Such an early conversion typically requires a high resolution ADC, which results in a demand for ADCs with increased resolution. One type of ADCs is an over-sampling converter with delta sigma modulation.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method of generating a spectrally shaped pseudo-random noise (PN) sequence, comprising:
   generating an L-level PN sequence, where L is an integer greater than 1;
   up-sampling the PN sequence by a factor of M, where M is an integer greater than 1;
   filtering the up-sampled PN sequence using a finite impulse response (FIR) filter of length M, where the coefficients of the FIR filter are chosen from a set of pre-determined values; and
   generating a data stream by switching sets of data patterns into the data stream based on the PN sequence, each set corresponding to a different value of the PN sequence.

2. The method of claim 1, wherein generating the L-level PN sequence includes generating a binary sequence.

3. The method of claim 2, wherein up-sampling includes inserting M−1 zeros between adjacent binary outputs of the binary sequence.

4. The method of claim 3, wherein filtering the up-sampled PN sequence includes filtering with coefficients chosen from 1 and −1.

5. The method of claim 1, wherein generating the L-level PN sequence includes generating the PN sequence using a cascaded flip-flop circuits with at least one feedback connection.

6. The method of claim 1, wherein up-sampling includes up-sampling with M equal to 2 for a first order spectral shaping and filtering the up-sampled PN sequence using a transfer function of $H(z)=1-z^{-1}$.

7. The method of claim 1, wherein up-sampling includes up-sampling with M equal to 2 for a second order spectral shaping and filtering the up-sampled PN sequence includes using a transfer function of $H(z)=1-z^{-1}-z^{-2}+z^{-3}$.

8. A method of generating a spectrally shaped pseudo-random noise (PN) sequence, comprising:
   determining a plurality of data patterns from L data patterns, each data pattern comprising a data stream of length M, where M is an integer greater than 1;
   generating an L-level PN sequence; and
   passing one data pattern among the L data patterns to an output according to the value of the L-level PN sequence such that the L-level PN sequence operatively selects which one of the plurality of data patterns is passed to the output.

9. The method of claim 8, wherein determining includes determining each of the plurality of patterns to be a portion of a spectrally shaped pseudo-random noise (PN) sequence.

10. The method of claim 8, wherein determining includes determining all of the plurality of patterns such that all of the determined patterns equal a desired spectrally shaped pseudo-random noise (PN) sequence.

11. The method of claim 8, wherein passing includes, when M=4, passing a first data pattern of 1, −1, −1, 1 with the L-level PN sequence being a first value and passing a second data pattern of −1, 1, −1, −1 with the L-level PN sequence being a second value.

12. The method of claim 8, wherein each of said data patterns comprises ternary data.

13. A method of performing delta-sigma modulation with dithering, comprising:
   receiving a modulator input;
   receiving a dithering signal from a spectrally shaped PN sequence generator, the spectrally shaped PN sequence generator producing the dithering signal using a data pattern from a plurality of pattern generators such that the data pattern is selected for output based on a corresponding value of a generated L-level PN sequence;
   performing delta-sigma modulation on the dithering signal;
   injecting the dithering signal into a circuit node of the modulator; and
   generating a modulator output according to both the modulator input and the dithering signal.

14. The method of claim 13, wherein receiving a dithering signal from a spectrally shaped PN sequence generator includes:

generating an L-level PN sequence, where L is an integer greater than 1;

up-sampling the PN sequence by a factor of M, where M is an integer greater than 1; and filtering the up-sampled RN sequence using a finite impulse response (FIR) filter of length M, where the coefficients of the FIR filter are chosen from a set of pre-determined values.

15. The method of claim 14, wherein generating the L-level PN sequence includes generating a binary sequence.

16. The method of claim 15, wherein up-sampling includes inserting M−1 zeros between adjacent outputs of the binary sequence.

17. The method of claim 13, wherein receiving a dithering signal from a spectrally shaped PN sequence generator includes:

determining a plurality of data patterns front L data patterns, each data pattern comprising a data stream of length M, where M is an integer greater than 1;

generating an L-level PN sequence; and passing one data pattern among the L data patterns to an output according to the value of the L-level PN sequence such that the L-level PN sequence operatively selects which one of the plurality of data patterns is passed to the output.

18. The method of claim 17, wherein determining includes determining each of the plurality of patterns to be a portion of a spectrally shaped pseudo-random noise (PN) sequence.

19. The method of claim 17, wherein determining includes determining all of the plurality of patterns such that all of the determined patterns equal a desired spectrally shaped pseudo-random noise (PN) sequence.

20. The method of claim 17, wherein passing includes, when M=4, passing a first data pattern of 1, −1, −1, 1 with the L-level PN sequence being a first value and passing a second data pattern of −1, 1, −1, −1 with the L-level PN sequence being a second value.

* * * * *